US009262448B2

(12) United States Patent
Peretz et al.

(10) Patent No.: US 9,262,448 B2
(45) Date of Patent: Feb. 16, 2016

(54) DATA BACKUP ACROSS PHYSICAL AND VIRTUALIZED STORAGE VOLUMES

(71) Applicant: INTERNATIONAL BUSINESS MACHINES CORPORATION, Armonk, NY (US)

(72) Inventors: Ofer Peretz, Haifa (IL); Eran Raichstein, Yokneam Ilit (IL); Asaf Yeger, Kiryat-Tivon (IL); Christopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 13/965,062

(22) Filed: Aug. 12, 2013

(65) Prior Publication Data
US 2015/0046402 A1 Feb. 12, 2015

(51) Int. Cl.
G06F 17/00 (2006.01)
G06F 17/30 (2006.01)

(52) U.S. Cl.
CPC .................. *G06F 17/30289* (2013.01)

(58) Field of Classification Search
None
See application file for complete search history.

(56) References Cited

U.S. PATENT DOCUMENTS

| 6,665,815 | B1* | 12/2003 | Goldstein et al. ............... 714/20 |
| 7,747,576 | B2* | 6/2010 | Micka .................. G06F 11/2074 707/646 |
| 8,117,168 | B1 | 2/2012 | Stringham |
| 8,166,265 | B1 | 4/2012 | Feathergill |
| 8,266,402 | B2 | 9/2012 | Garimella |
| 8,321,377 | B2* | 11/2012 | Michael et al. ............... 707/639 |
| 8,782,009 | B2* | 7/2014 | Shaath .............. G06F 17/30085 707/661 |
| 2003/0140204 | A1* | 7/2003 | Ashton et al. .................. 711/162 |
| 2003/0236956 | A1* | 12/2003 | Grubbs et al. ................ 711/162 |
| 2004/0044863 | A1* | 3/2004 | Trimmer ............... G06F 3/0607 711/161 |
| 2006/0053333 | A1* | 3/2006 | Uhlmann et al. ................... 714/2 |
| 2007/0005915 | A1* | 1/2007 | Thompson et al. ........... 711/162 |
| 2007/0244938 | A1* | 10/2007 | Michael et al. ............... 707/204 |
| 2007/0260831 | A1* | 11/2007 | Michael et al. ............... 711/162 |
| 2008/0133208 | A1* | 6/2008 | Stringham ..................... 703/20 |
| 2010/0049929 | A1 | 2/2010 | Nagarkar et al. |
| 2010/0082921 | A1 | 4/2010 | Thompson et al. |

(Continued)

FOREIGN PATENT DOCUMENTS

WO 2011082138 A1 7/2011

OTHER PUBLICATIONS

IBM, "VSS backup and restore operations to a tivoli storage manager server available with reduced software requirements.", 2011. Can be found at: http://www-01.ibm.com/support/docview.wss?uid=swg21451441.

*Primary Examiner* — Hung Le
(74) *Attorney, Agent, or Firm* — Matthew C. Zehrer

(57) ABSTRACT

Machines, systems and methods for backing up data, the method comprising retrieving identifying information about target data storage volumes from which target data is to be backed up; communicating the identifying information to a proxy application installed on a backup computing system utilized to backup the target data stored on the target data storage volumes, wherein the proxy application uses the identifying information to place the target data storage volumes in a first state in which write operations may not be performed to the target data storage volumes, wherein the proxy application causes snapshots to be taken of the target data storage volumes of a first type and a second type, in response to determining that the target data storage volumes are placed in the first state.

20 Claims, 10 Drawing Sheets

(56) References Cited

U.S. PATENT DOCUMENTS

2011/0047340 A1* 2/2011 Olson et al. ............ 711/162
2011/0167194 A1* 7/2011 Scales ............ G06F 11/1438
　　　　　　　　　　　　　　　　　　　　　711/6
2011/0167221 A1　7/2011 Pangal et al.
2013/0174165 A1* 7/2013 Chopra ............ G06F 11/1482
　　　　　　　　　　　　　　　　　　　　　718/102

* cited by examiner

DATA BACKUP ACROSS PHYSICAL AND VIRTUALIZED STORAGE VOLUMES

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to data backup systems and, more particularly, to a system and method for enabling consistent data backup across virtualized and physical data storage volumes.

BACKGROUND

Most currently available data backup tools don't have the capability to backup data storage volumes that reside on virtual disks along with related or counterpart data storage volumes that reside on physical disks in a synchronized manner. That is, most data backup tools use two different mechanisms, one to backup data from the virtual volumes and another to backup data from the physical volumes, respectively.

In other words, the backup (e.g., snapshot) operations performed on the virtual volumes and the physical volumes are performed in two separate operations. This means that the backup copies will not be consistent (i.e., not copied at the exact same point in time) because the currently available backup mechanisms are unable to synchronously perform the snapshot operations on both the virtual volumes and the physical volumes at the same time.

For example, consider a scenario where mapped drives C:\ and D:\ reside on virtual disks and drive E:\ on a physical disk. If a SQL application is installed on drive C:\ the SQL database on drive D:\ and the related SQL logs on drive E:\ then the backups performed on the volumes across the virtual and physical domains would not be synchronized.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, machines, systems and methods for backing up data are provided. The method comprises retrieving identifying information about target data storage volumes from which target data is to be backed up; communicating the identifying information to a proxy application installed on a backup computing system utilized to backup the target data stored on the target data storage volumes, wherein the proxy application uses the identifying information to place the target data storage volumes in a first state in which write operations may not be performed to the target data storage volumes, wherein the proxy application causes snapshots to be taken of the target data storage volumes of a first type and a second type, in response to determining that the target data storage volumes are placed in the first state.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

Figure 1:
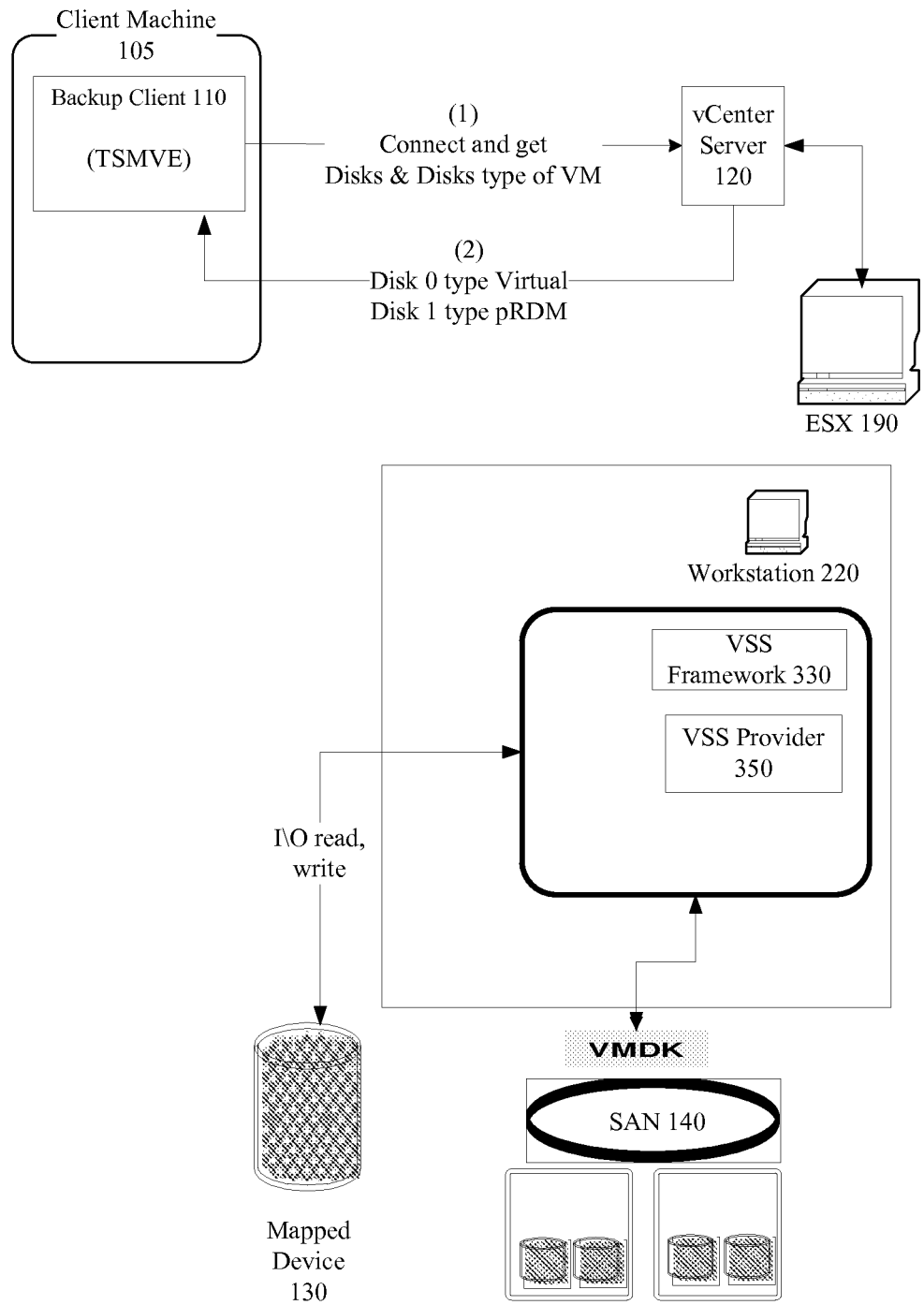
FIGS. 1 through 6 illustrate example computing environments in accordance with one or more embodiments, wherein snapshots of virtual and physical data volumes are taken.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, it may be desirable to back up a software application that writes data to both virtual data storage volumes and physical data storage volumes. The virtual volumes may be supported by a hypervisor (e.g., VMWare) and the physical volumes may be supported by a controller (e.g., via Raw Device Mapping or RDM). RDM is an option in the VMware server virtualization environment that enables a storage logical unit number (LUN) to be directly connected to a virtual machine (VM) from a storage area network (SAN).

In the examples provided below, a backup client 110 may use a volume shadow copy service (VSS) to take a snapshot of the virtual volumes and use a flash copy manager (FCM) to perform a snapshot of the physical volumes. The VSS provides the backup infrastructure for an operating system, as well as a mechanism for creating consistent point-in-time copies of data known as shadow copies. VSS may be used to produce consistent manual or automatic backup copies or snapshots of data.

In one implementation, the backup system may comprise a proxy that communicates with the backup client 110 as well as a VSS provider splitter (VPS). The proxy is implemented to receive commands issued by the backup client (e.g., commands to freeze and unfreeze the virtual machine environment so that write access to the virtual volumes and the physical volumes are controlled). The proxy interprets the commands received from the backup client 110 and communicates with the VPS and the physical volume controller (e.g., FCM).

VPS in turn communicates with the VSS framework to freeze writes to the virtual volumes and to perform a snapshot of the virtual volumes. The proxy communicates with the physical volume controller (e.g., FCM) to block writes to the physical volume and take a snapshot of the physical volume at the same state as the snapshot taken from the virtual volumes. In this manner, the snapshots take from both the physical and the virtual volumes are in the same state.

In other words, the command to freeze write operations to both the physical volume and the virtual volumes is issued (by the backup client) and serviced (by the proxy) at the same time. Therefore, even if the actual snapshots of both the physical and the virtual volumes may not be taken at exactly the same time, the data in the snapshots is from the same state. After the snapshots are taken, then access to both the physical and the virtual volumes is released.

Referring to FIGS. 1 through 7, a more detailed implementation of one or more embodiments is provided below to explain the concepts, features and options generally disclosed above in a higher level of detail. It is noteworthy however that the details disclosed below are for the purpose of providing a better understanding of the example embodiments and such details in no way should be construed as limiting the general scope of the claimed subject matter to specific details.

Referring to FIG. 1, an example embodiment is illustrated in which VM disk information (e.g., disk numbers and disk types) is requested by the backup client 110 from the virtual center server (vCenter Server) 120. Client 110 may be running on top of a client machine 105. In one embodiment, virtual center server 120 may communicate with a virtualized computing system such as ESX 190 which is an enterprise-level computer virtualization product offered by VMware, Inc.

Figure 2:
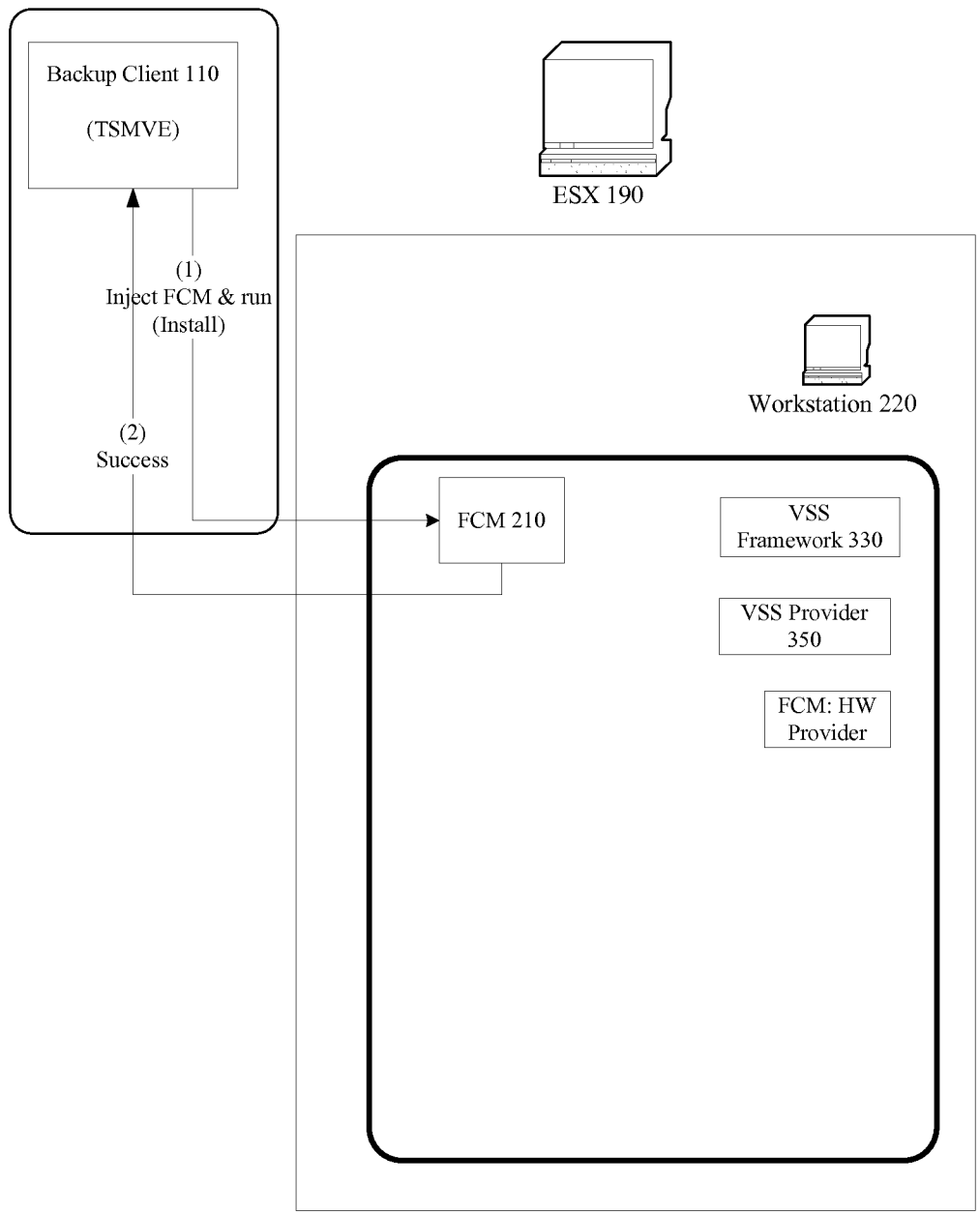

Referring to FIG. 2, an example embodiment is illustrated in which the backup client 110 injects and installs a FCM 210 on a workstation 220 (e.g., VMWare workstation), wherein the FCM 210 is configured to take snapshots of different hardware storage device (e.g., Raw Devices). FCM hardware provider is a software component in the FCM 210 and may be utilized to perform a snapshot of the physical (i.e., hardware) storage.

Figure 3:
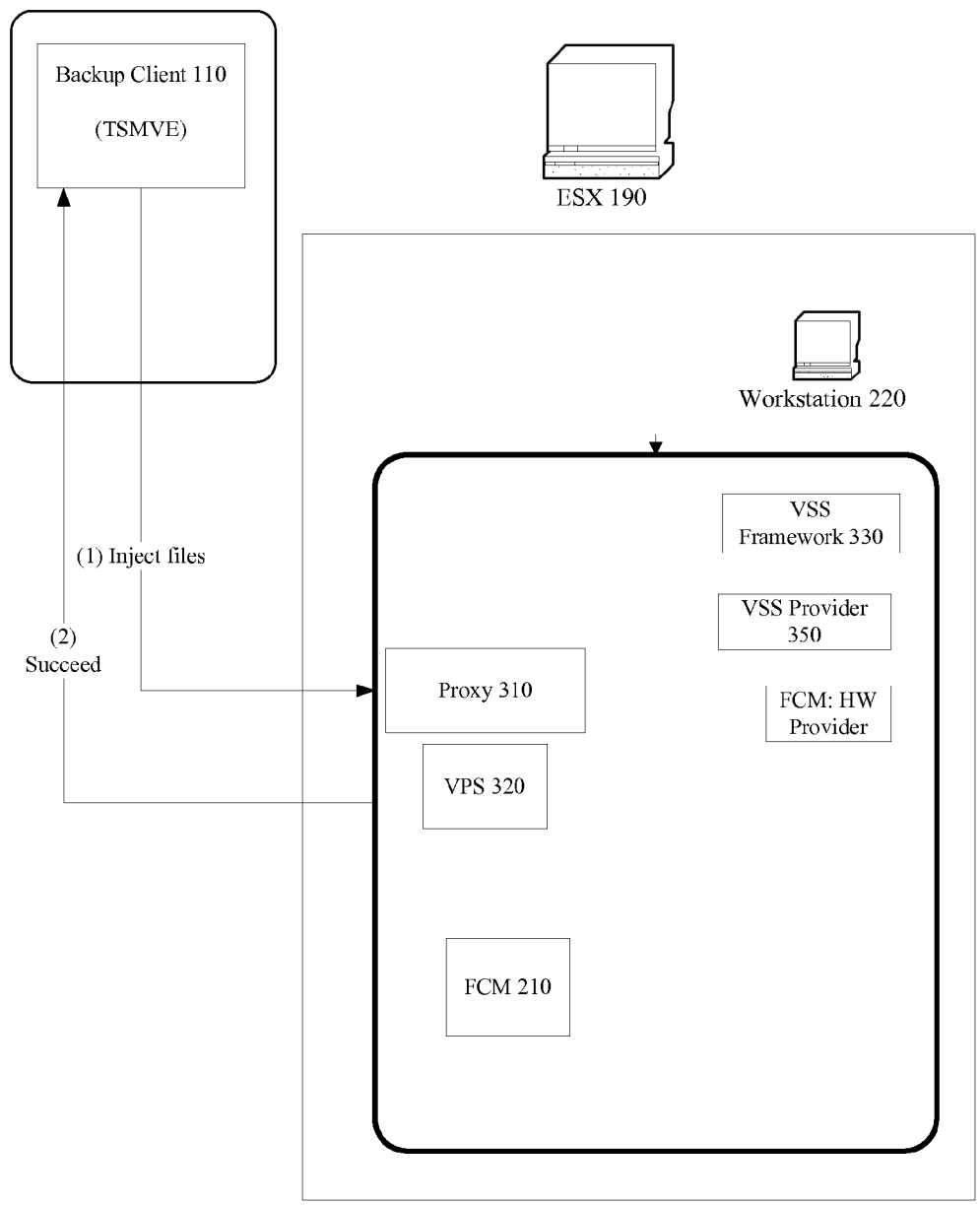

Referring to FIG. 3, an example embodiment is illustrated in which the backup client 110 injects and installs proxy 310 and VPS files 320, wherein the proxy 310 is configured to communicate with the backup client 110 and freeze a selected data volume by communicating with the VSS framework 330. The proxy 310 desirably supports the VSS framework 330 and FCM 210 installer, such that using VMware application programming interface (API) the backup client 110 may install FCM 210. In one embodiment, VM disk information (e.g., disk numbers and disk types—i.e., virtual or physical) that were requested by the backup client 110 from the virtual center server 120 are provided to the proxy 310 so that the proxy 310 may match one or more target volumes on the VSS provider 350 that may be used to perform the snapshot operation on the target volumes.

Figure 4:
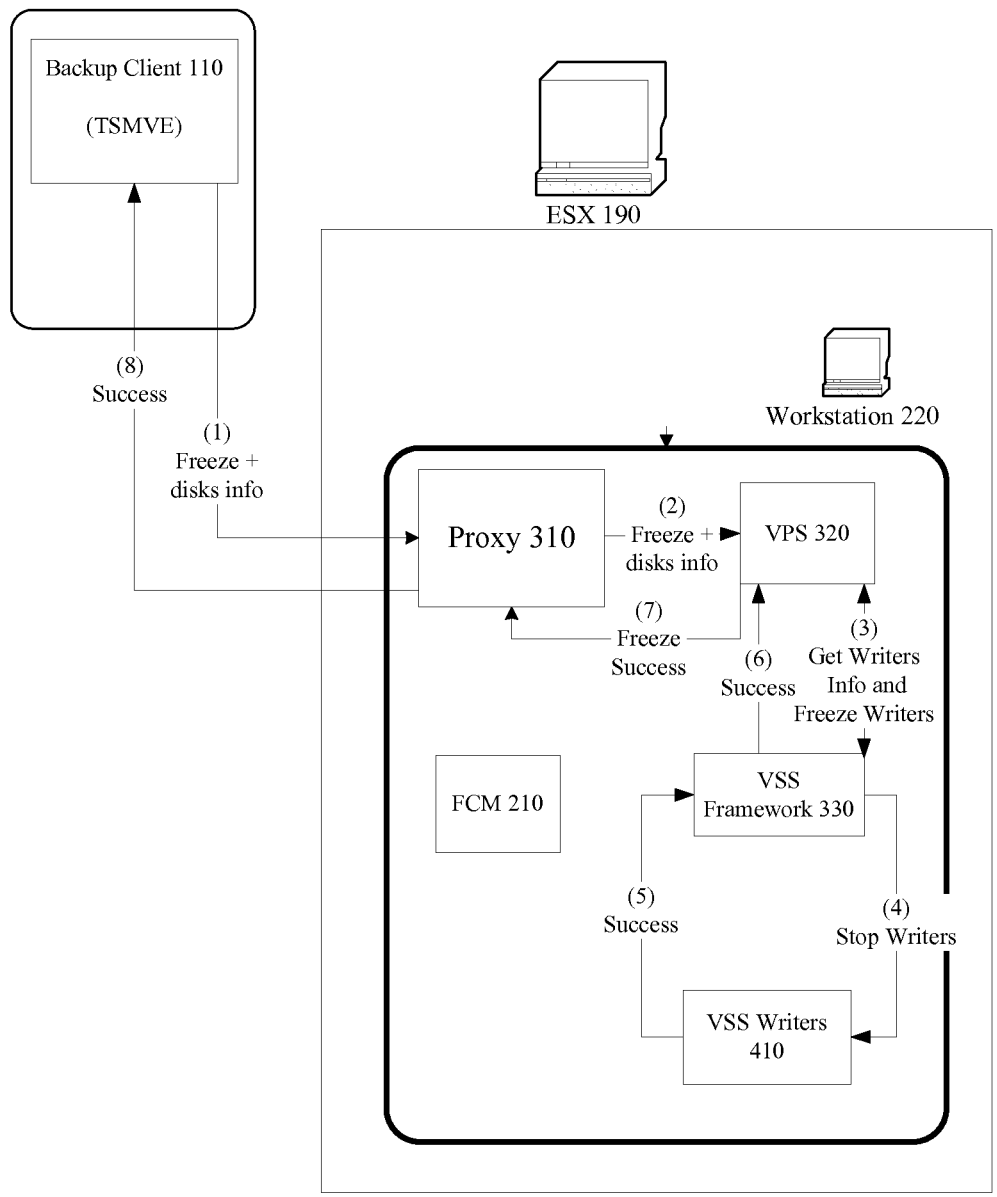

Referring to FIG. 4, an example embodiment is illustrated in which the backup client 110 issues a freeze writers command to the proxy 310 to cause the VPS 320 to stop the applications that are writing to the virtual disks (e.g., VSS writers 410) from writing to the virtual disks. The proxy 310 may update the VSS framework 330 with the VM disk information and submit a freeze command to place the data volume in a frozen state. The VPS 320 is configured to allow the backup client 110 to communicate with both the hardware device managers and the VSS framework 330, so that both the virtual volumes and the hardware storage devices are locked, preventing any further writes to either the virtual data volumes or physical data volumes.

Figure 5:
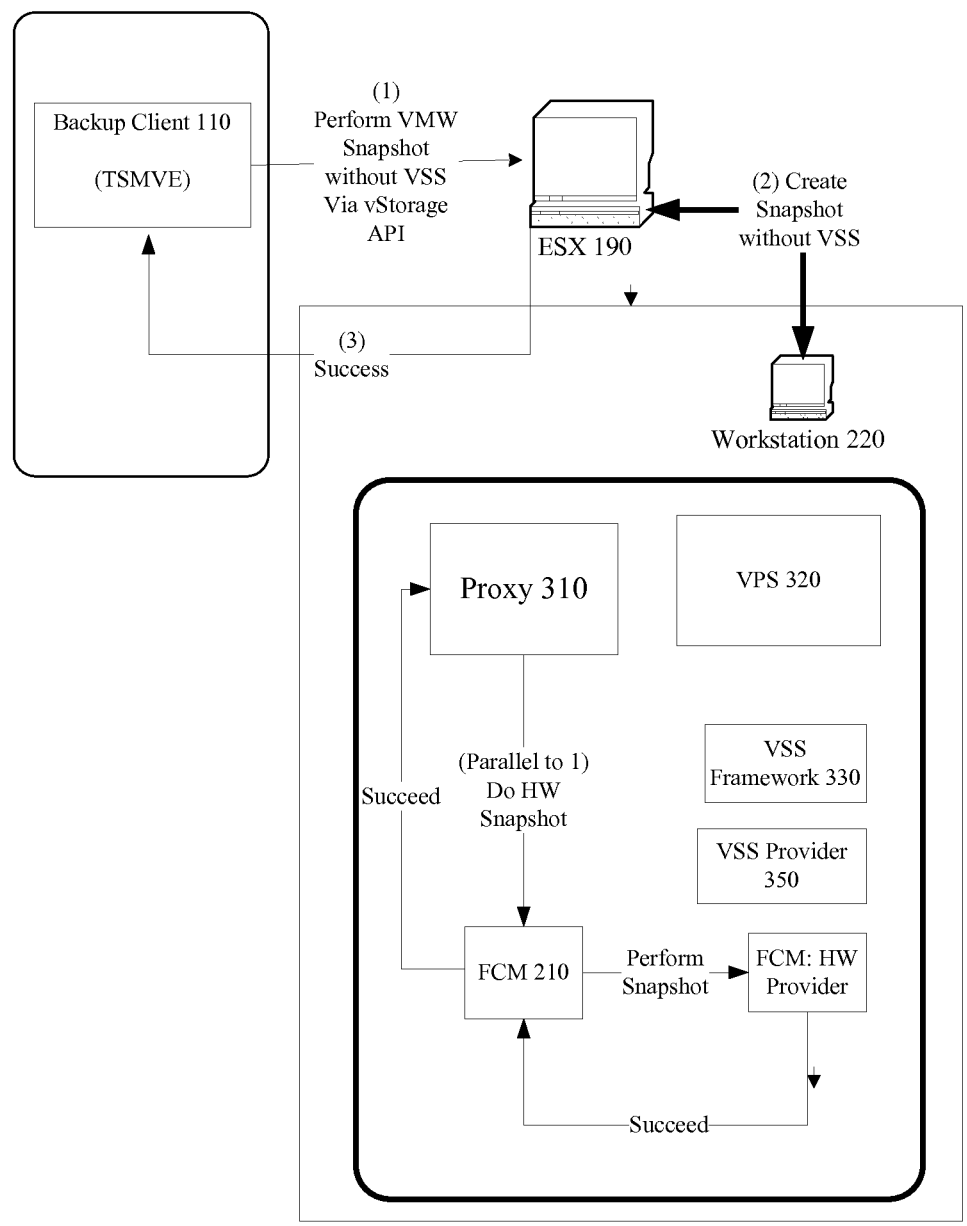

Referring to FIG. 5, the backup client 110 submits a request to perform snapshots of both the virtual volumes and the physical volumes, once the data volumes are in a frozen state. It is noteworthy that since both the physical volumes and the virtual volumes are frozen at the same time, the taken snapshot of both types of volumes are consistent, even if the actual snapshots are not taken exactly at the same time. In one embodiment, using the VPS 320 (which may be implemented as a part of the proxy 310) the snapshot of the physical disks (e.g. pRDM) are taken (e.g., using FCM 210 installed on workstation 220) and the snapshot of the virtual disks are taken via VMware infrastructure (e.g., using VSS provider 350).

Figure 6:
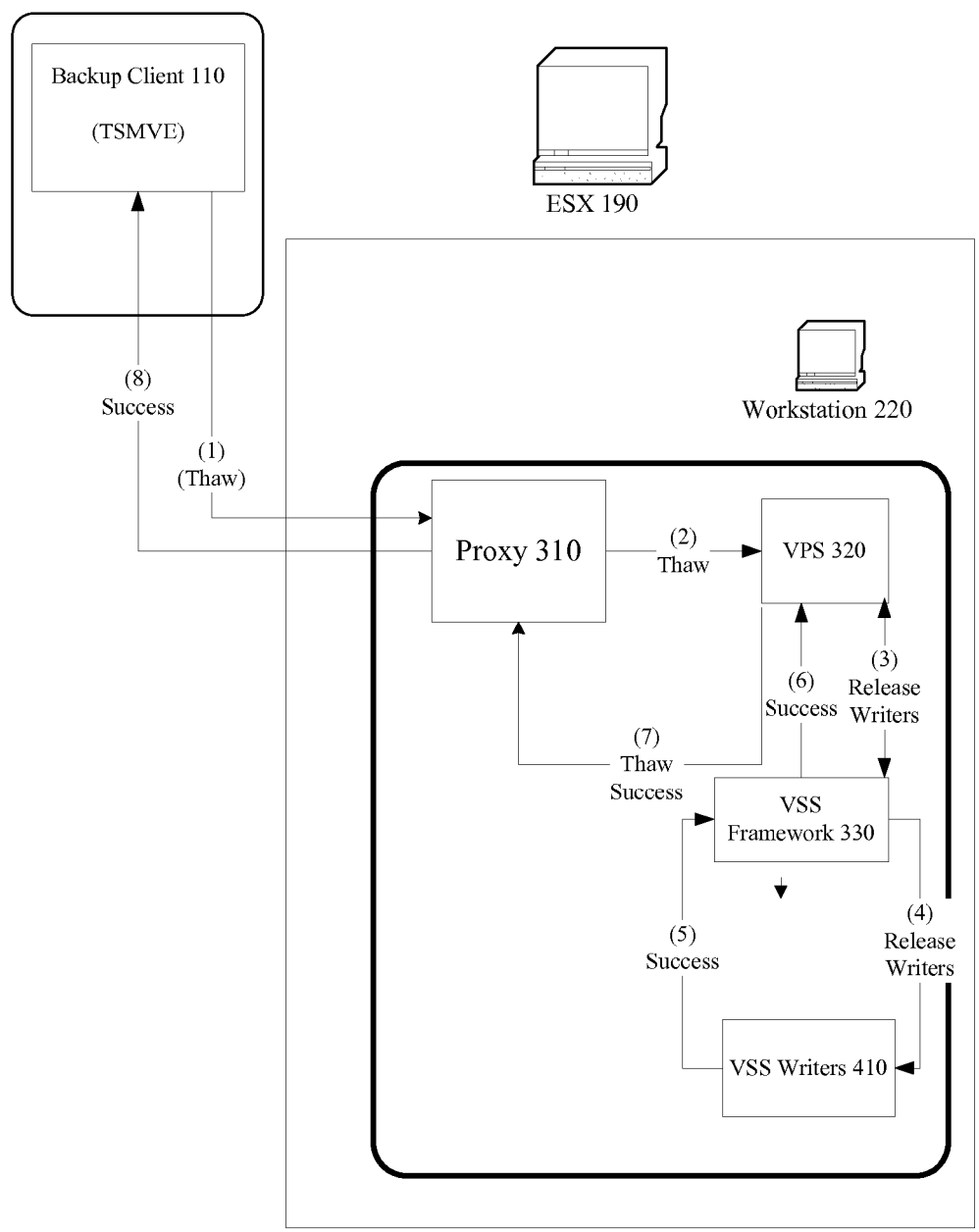

Referring to FIG. 6, once the snapshot operations on the physical and virtual volumes in the frozen state is completed, then the backup client 110 issues a thaw request for the proxy 310 to ask the VSS framework 330 to release the locks on the virtual and physical volumes so that the volumes are removed from the frozen state and data may be written to the volumes.

Figure 7A:
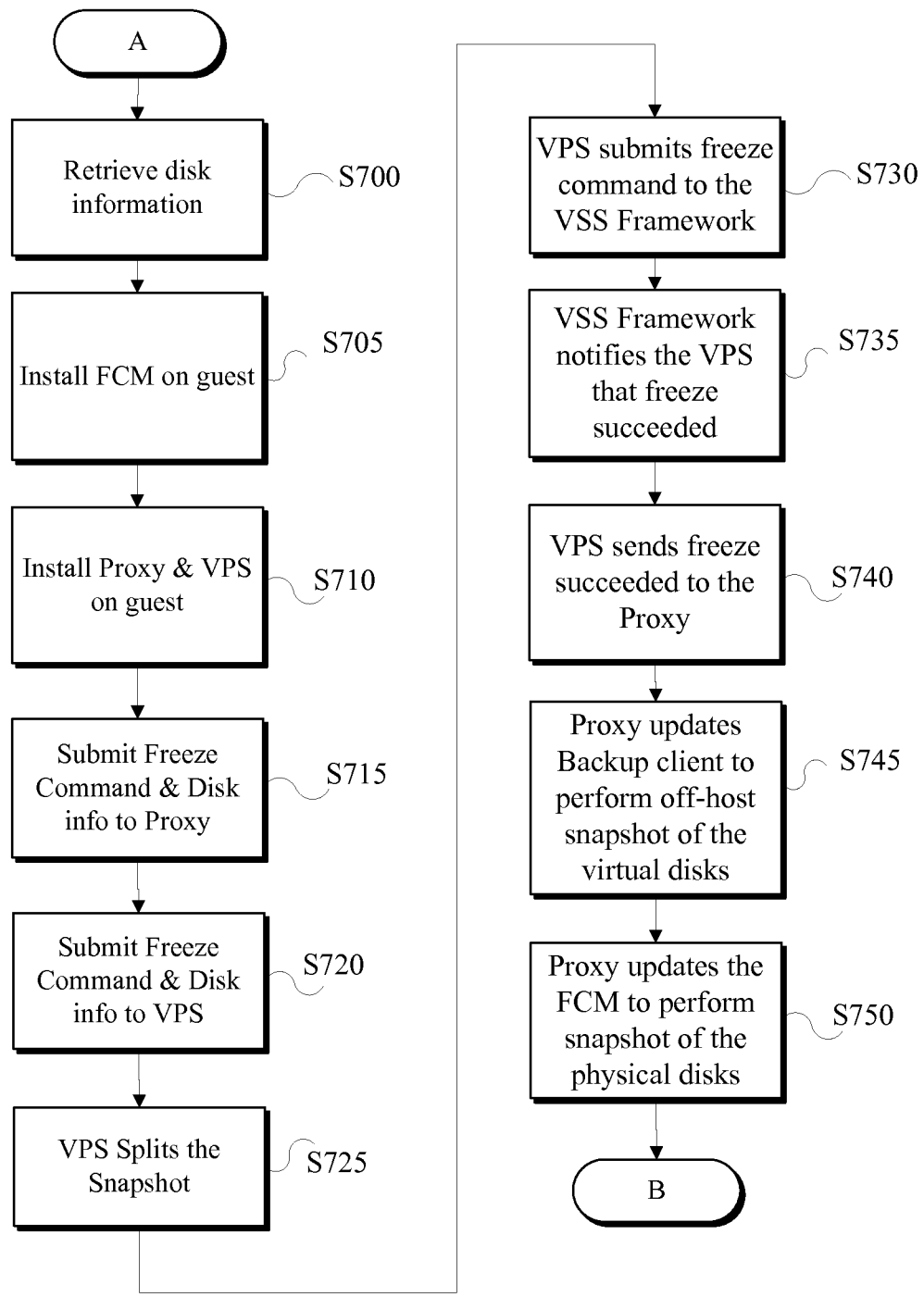
FIGS. 7A and 7B are flow diagrams of an example method for taking snapshots of virtual and physical data volumes in accordance with one embodiment.
Figure 7B:
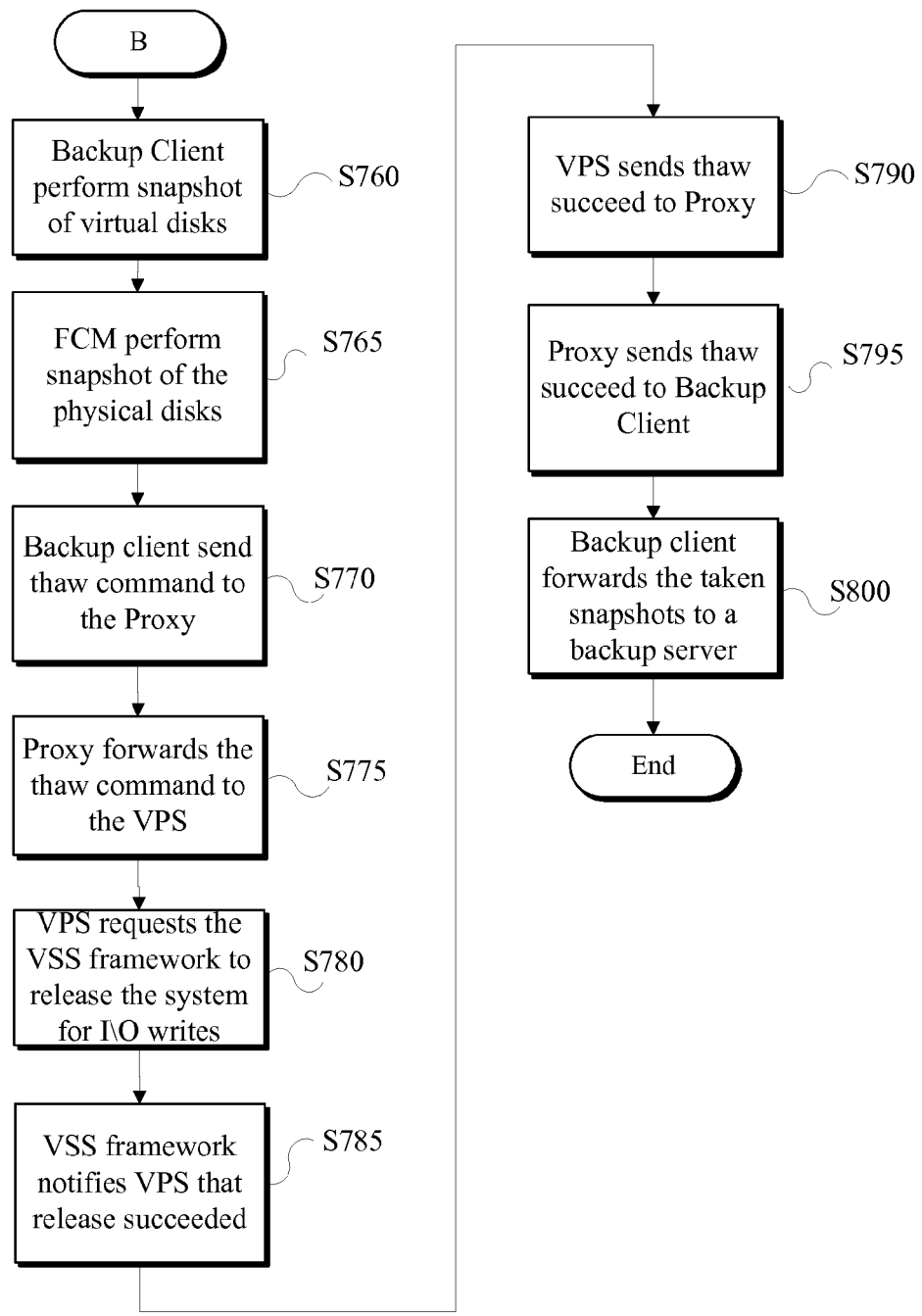

Referring to FIGS. 7A and 7B, without limitation, in an example embodiment implemented using VMWare vStorage API and pRDM type physical storage volumes, the following process may be utilized to backup data stored on the virtual storage volumes and the physical (e.g., pRDM) volumes:

1. Backup client 110 retrieves, via VMware vStorage API, information about a guest machine's disks and disk types (e.g., pRDM, virtual disks) (S700).
2. Backup client 110 injects and installs a FCM 210 application on the guest machine where the snapshot operations are to be performed (S705).
3. Backup client 110 injects executable files to install the proxy 310 and the VPS 320 on the guest machine (S710).
4. Backup client 110 submits a freeze command and disk information to the proxy 310 via VMware Web Services API (S715).
5. Backup client 110 submits the freeze command and disk information (e.g., virtual or physical disk (pRDM)) to VPS 320 (S720).
6. The VPS 320 splits the snapshot (S725) by doing the following:
    a. For a disk with type pRDM, the VPS 320 finds the volumes that reside on it.
    b. For a volume, the VPS 320 adds the volume to the shadow copy set with the FCM 210 provider ID (e.g., using AddToSnapshotSet( )method).

c. For a virtual disk (e.g., type VIRTUAL), the VPS 320 finds one or more volumes that reside on the virtual disk.

d. For a volume that resides on the virtual disk, the VPS 320 adds the volume to the shadow copy set with the system provider ID.

7. The VPS 320 submits a freeze command to the VSS framework 330 (S730).
8. The VSS framework 330 notifies the VPS 320 that freeze succeeded (S735).
9. The VPS 320 sends freeze succeeded to the proxy 310 (S740).
10. The proxy 310 performs the following:
    a. Update the backup client 110 to perform off-host snapshot of the virtual disks (S745). The proxy updates the backup client to perform off-host snapshot (this snapshot is done via using VMWare vStorage API, for example. This snapshot may be of virtual disks). The proxy in addition updates FCM software to perform snapshot of the physical disks.
    b. Update the FCM 210 (run FCM 210 CLI) to perform snapshot of the physical (e.g., pRDM) disks, via in-guest (S750).
11. The backup client 110 performs a snapshot of the virtual disks via VMware infrastructure using VSS framework 330 (S760).
12. In parallel to the above snapshot FCM 210 may perform snapshots of the physical (e.g., pRDM) disks (S765).
13. Once the snapshots are completed, the backup client 110 may send a so-called thaw command to the proxy 310 (S770).
14. The proxy 310 forwards the thaw command to the VPS 320 (S775).
15. The VPS 320 requests the VSS framework 330 to release the system for I\O writes (S780).
16. The VSS framework 330 may notify VPS 320 that the release succeeded (S785).
17. The VPS 320 may send thaw succeed to the proxy 310, and the proxy 310 in turn may notify the backup client 110 (S790, S795).
18. The backup client 110 may forward the taken snapshots to a backup server (S795).

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 8A:
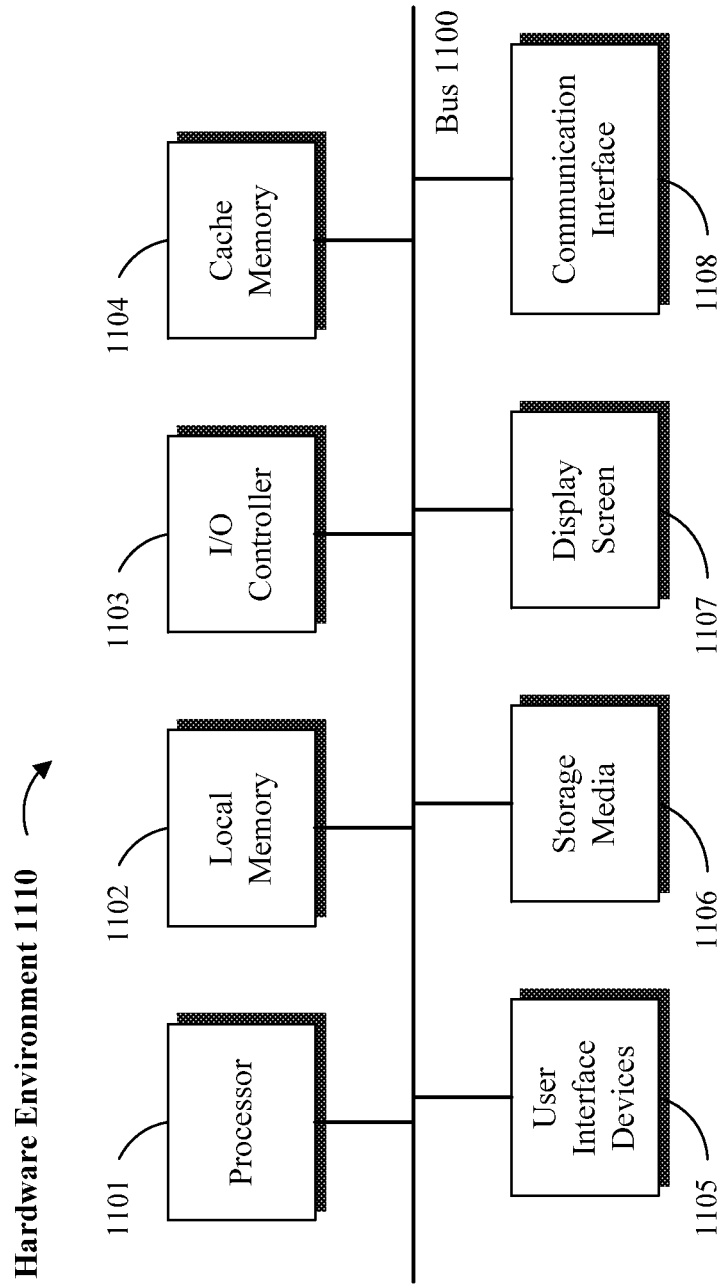
FIGS. 8A and 8B are block diagrams of hardware and software environments in which the disclosed systems and methods may operate, in accordance with one or more embodiments.
Figure 8B:
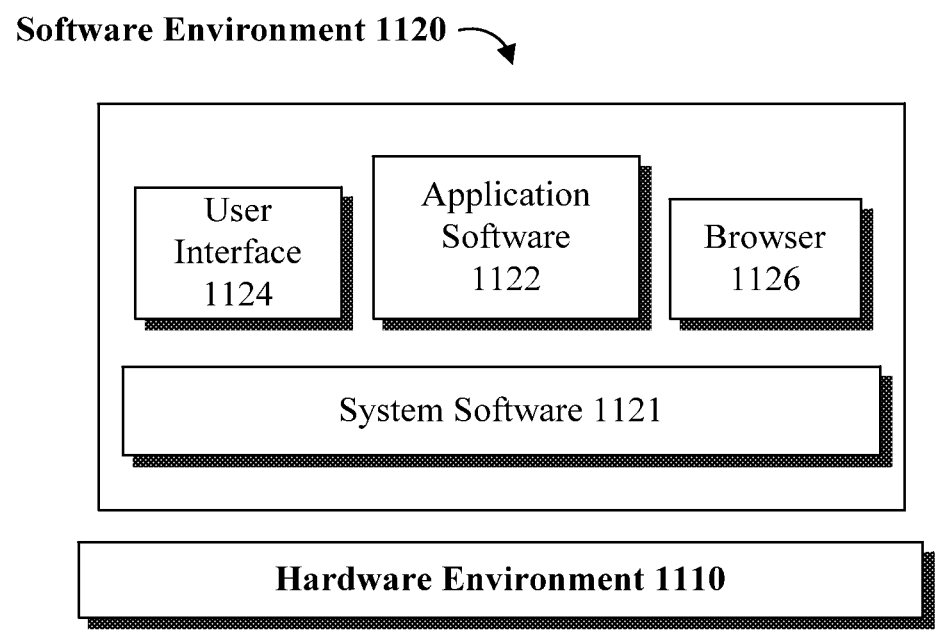

Referring to FIGS. 8A and 8B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 8A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-Ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 8B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for backing up data, the method comprising:
   retrieving identifying information about target data storage volumes from which target data is to be backed up; and
   communicating the identifying information to a proxy application installed on a backup computing system utilized to backup the target data stored on the target data storage volumes,
   wherein the proxy application uses the identifying information to place the target data storage volumes in a first state in which write operations may not be performed to the target data storage volumes, and wherein the proxy application causes snapshots to be taken of the target data storage volumes in response to determining that the target data storage volumes are placed in the first state, the target data storage volumes comprising a physical data storage volume associated with a first physical storage device absent of virtual storage volumes and a virtual data storage volume associated with a second physical storage device.

2. The method of claim 1, wherein the identifying information comprises data about whether the target data storage volumes are physical data storage volumes or virtual data storage volumes.

3. The method of claim 2, wherein a request is submitted to the proxy application to remove the target data storage volumes from the first state, in response to determining that the snapshots of the target data storage volumes has been successfully taken.

4. The method of claim 3, wherein the proxy application places the target data storage volumes in a first state by:
   communicating with a first copy manager to place one or more target physical data storage volumes in the first state; and
   communicating with a second copy manager to place one or more target virtual data storage volumes of in the first state.

5. The method of claim 4, wherein the first copy manager is a flash copy manager (FCM) installed on the backup computing system and further performs a snapshot of the one or more target physical data storage volumes.

6. The method of claim 5, wherein the second copy manager is a volume shadow copy service (VSS) installed on the backup computing system and further performs a snapshot of the one or more target virtual data storage volumes.

7. The method of claim 6, wherein the proxy application communicates with a VSS provider splitter (VSP) to communicate with the VSS to place the one or more target virtual data volumes in the first state.

8. The method of claim 1, wherein the snapshot of the one or more target data storage volumes of the physical data storage volume type occurs prior to the snapshot of the one or more target data storage volumes of the virtual data storage volume type.

9. The method of claim 1, wherein the snapshot of the one or more target data storage volumes of the physical data storage volume type occurs subsequent to the snapshot of the one or more target data storage volumes of the virtual data storage volume type.

10. The method of claim 1, wherein the snapshot of the one or more target data storage volumes of the physical data storage volume type occurs contemporaneously to the snapshot of the one or more target data storage volumes of the virtual data storage volume type.

11. A system for data backup, the system comprising:
   a first circuit for retrieving identifying information about target data storage volumes from which target data is to be backed up; and
   a second circuit for communicating the identifying information to a proxy application installed on a backup computing system utilized to backup the target data stored on the target data storage volumes,
   wherein the proxy application uses the identifying information to place the target data storage volumes in a first state in which write operations may not be performed to the target data storage volumes, and wherein the proxy application causes snapshots to be taken of the target data storage volumes in response to determining that the target data storage volumes are placed in the first state, the target data storage volumes comprising a physical data storage volume associated with a first physical storage device absent of virtual storage volumes and a virtual data storage volume associated with a second physical storage device.

12. The system of claim 11, wherein the identifying information comprises data about whether the target data storage volumes are physical data storage volumes or virtual data storage volumes.

13. The system of claim 12, wherein a request is submitted to the proxy application to remove the target data storage volumes from the first state, in response to determining that the snapshots of the target data storage volumes has been successfully taken.

14. The system of claim 13, wherein the proxy application places the target data storage volumes in a first state by:
communicating with a first copy manager to place one or more target physical data storage volumes in the first state; and
communicating with a second copy manager to place one or more target virtual data storage volumes in the first state.

15. The system of claim 11, wherein the snapshot of the one or more target data storage volumes of the physical data storage volume type occurs prior to the snapshot of the one or more target data storage volumes of the virtual data storage volume type.

16. A computer program product comprising a non-transitory computer readable storage medium having a computer readable program, wherein the computer readable program when executed on a computer causes the computer to:
retrieve identifying information about target data storage volumes from which target data is to be backed up; and
communicate the identifying information to a proxy application installed on a backup computing system utilized to backup the target data stored on the target data storage volumes,
wherein the proxy application uses the identifying information to place the target data storage volumes in a first state in which write operations may not be performed to the target data storage volumes, and wherein the proxy application causes snapshots to be taken of the target data storage volumes in response to determining that the target data storage volumes are placed in the first state, the target data storage volumes comprising a physical data storage volume associated with a first physical storage device absent of virtual storage volumes and a virtual data storage volume associated with a second physical storage device.

17. The computer program product of claim 16, wherein the identifying information comprises data about whether the target data storage volumes are physical data storage volumes or virtual data storage volumes.

18. The computer program product of claim 17, wherein a request is submitted to the proxy application to remove the target data storage volumes from the first state, in response to determining that the snapshots of the target data storage volumes has been successfully taken.

19. The computer program product of claim 18 wherein the proxy application places the target data storage volumes in a first state by:
communicating with a first copy manager to place one or more target physical data storage volumes in the first state; and
communicating with a second copy manager to place one or more target virtual data storage volumes in the first state.

20. The computer program product of claim 16, wherein the snapshot of the one or more target data storage volumes of the physical data storage volume type occurs prior to the snapshot of the one or more target data storage volumes of the virtual data storage volume type.

* * * * *